(12) United States Patent
Tanaka (10) Patent No.: US 8,432,526 B2
(45) Date of Patent: Apr. 30, 2013

(54) ELECTRO-OPTICAL DEVICE AND ELECTRONIC APPARATUS INCLUDING THE SAME

(75) Inventor: Takaaki Tanaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 546 days.

(21) Appl. No.: 12/237,153

(22) Filed: Sep. 24, 2008

(65) Prior Publication Data

US 2009/0079922 A1 Mar. 26, 2009

(30) Foreign Application Priority Data

Sep. 25, 2007 (JP) ................................ 2007-246682

(51) Int. Cl.
*G02F 1/1333* (2006.01)
(52) U.S. Cl.
USPC ........................... 349/161; 349/122; 349/138
(58) Field of Classification Search .................. 349/111, 349/40, 138, 153–154, 122, 161
See application file for complete search history.

(56) References Cited

U.S. PATENT DOCUMENTS

| 5,422,148 A | * | 6/1995 | Itoh et al. ..................... 428/1.26 |
| 2003/0001997 A1 | * | 1/2003 | Ilcisin et al. ................... 349/122 |
| 2005/0140912 A1 | * | 6/2005 | Hirakata et al. ............... 349/153 |
| 2006/0203137 A1 | * | 9/2006 | Nakayoshi et al. ............. 349/38 |
| 2006/0203171 A1 | * | 9/2006 | Ozawa ........................... 349/143 |
| 2007/0002235 A1 | * | 1/2007 | Tanaka et al. .................. 349/123 |
| 2007/0146598 A1 | * | 6/2007 | Yokokawa et al. ............ 349/123 |
| 2007/0268442 A1 | * | 11/2007 | Oh et al. ........................ 349/149 |

FOREIGN PATENT DOCUMENTS

| JP | 61-093429 A | 5/1986 |
| JP | 07-098460 A | 4/1995 |
| JP | 2003-248213 A | 9/2003 |
| JP | 2004-354606 A | 12/2004 |
| JP | 2005-202332 | 7/2005 |
| JP | 2005-208078 | 8/2005 |
| JP | 2006-267906 A | 10/2006 |

\* cited by examiner

*Primary Examiner* — Edward Glick
*Assistant Examiner* — Dennis Y. Kim
(74) *Attorney, Agent, or Firm* — Maschoff Brennan

(57) ABSTRACT

An electro-optical device includes a pair of substrates, an electro-optical material sandwiched between the pair of substrates, an electrode on one of the pair of substrates, an inorganic alignment layer disposed on the one of the pair of substrates, and a heat-dissipating layer disposed between the electrode and the inorganic alignment layer on the one of the pair of substrates.

9 Claims, 6 Drawing Sheets

ELECTRO-OPTICAL DEVICE AND ELECTRONIC APPARATUS INCLUDING THE SAME

BACKGROUND

1. Technical Field

The present invention relates to an electro-optical device, such as a liquid crystal device, and an electronic apparatus, such as a liquid crystal projector, which includes the electro-optical device.

2. Related Art

When such an electro-optical device is used, for example, in an electronic apparatus provided with a strong light source, such as a projector, there is a possibility that the temperature of the electro-optical device is increased by the radiant heat of the light source or the like, resulting in degradation of the properties of an electro-optical material, such as a liquid crystal. Consequently, techniques have been proposed in which heat dissipation is improved by using a transmissive oxide crystal body, such as magnesium oxide (MgO) or yttrium oxide ($Y_2O_3$), or a fluoride single crystal, such as calcium fluoride ($CaF_2$), magnesium fluoride ($MgF_2$), or barium fluoride ($BaF_2$), as a dustproof substrate in a liquid crystal display device, which is an example of an electro-optical device. For example, refer to JP-A-2005-202332 (Patent Document 1) and JP-A-2005-208078 (Patent Document 2).

However, when a liquid crystal device, which is an example of an electro-optical device, includes an inorganic alignment layer, an inorganic material constituting the inorganic alignment layer has low thermal conductivity. In such a case, even if the technique described in Patent Document 1 or 2 is used, the heat of its liquid crystal layer is not dissipated sufficiently, which is a technical problem to be solved.

SUMMARY

An advantage of some aspects of the invention is that it provides an electro-optical device which can efficiently dissipate the heat of an electro-optical material so that the properties of the electro-optical material can be prevented from being degraded, and an electronic apparatus including the electro-optical device.

According to a first aspect of the invention, an electro-optical device includes a pair of substrates; a layer of an electro-optical material sandwiched between the pair of substrates; an inorganic alignment layer disposed on a side, facing the layer of the electro-optical material, of at least one of the pair of substrates, the inorganic alignment layer being used to control the alignment state of the electro-optical material; and a heat-dissipating layer disposed as an underlying layer with respect to the inorganic alignment layer on the at least one of the pair of substrates, the heat-dissipating layer dissipating heat of the electro-optical material.

An electro-optical device according to the first aspect of the invention includes an inorganic alignment layer composed of an inorganic material, such as SiO or $SiO_2$, disposed on a side, facing a layer of an electro-optical material, of at least one of a pair of substrates. An inorganic alignment layer may also be provided on a side of the other substrate facing the layer of the electro-optical material, or an organic alignment layer may be provided thereon. The layer of the electro-optical material, such as a liquid crystal, is sandwiched between the pair of substrates, and the electro-optical material is in a predetermined alignment state between the substrates. The term "predetermined alignment state" means an alignment state of the electro-optical material controlled by using the inorganic alignment layer. For example, when the predetermined alignment state is set as a vertical alignment state, an inorganic alignment layer may be formed by a method in which an inorganic material is deposited on a substrate, for example, by oblique vapor deposition or directional sputtering, for example, at an angle of 40° to 60° with respect to the normal direction of the substrate. Alternatively, for example, when the predetermined alignment state is set as a horizontal alignment state, an inorganic alignment layer may be formed by a method in which an inorganic material is deposited on a substrate, for example, by oblique vapor deposition or directional sputtering, for example, at an angle of 80° to 85° with respect to the normal direction of the substrate.

The heat-dissipating layer is composed of an inorganic material having relatively high thermal conductivity, such as $Al_2O_3$, MgO, or $TiO_2$, and is disposed as an underlying layer with respect to the inorganic alignment layer on at least one of the substrates. The heat-dissipating layer dissipates the heat of the electro-optical material by being partially exposed to air or by being connected to a metal or the like having higher thermal conductivity than the heat-dissipating layer.

Through research, the inventor has found the following: In general, when an electro-optical device is used, for example, as a light valve for a liquid crystal projector, strong light from a light source, such as a halogen lamp, enters the electro-optical device, resulting in an increase in the temperature of an electro-optical material. In order to suppress the increase in the temperature of the electro-optical material, for example, even if heat-dissipating members are provided outside a pair of substrates sandwiching a layer of the electro-optical material, the temperature distribution in the electro-optical device is shown as a convex upward curve in a graph where the positions of the layers are plotted on the abscissa and the temperatures are plotted on the ordinate. That is, even if the heat-dissipating members are provided outside the pair of substrates, it is difficult to efficiently dissipate the heat of the electro-optical material located in the middle of the electro-optical device in the deposition direction. In addition, the thermal conductivity of the inorganic material constituting the inorganic alignment layer is low, and thus the heat of the electro-optical material is not easily transferred to the substrates, the heat-dissipating members, etc.

According to the first aspect of the invention, the heat-dissipating layer is disposed as an underlying layer with respect to the inorganic alignment layer on at least one of the substrates. That is, the heat-dissipating layer is disposed inside the space between the pair of substrates. Thereby, it is possible to form a region having a relatively low temperature in the vicinity of the position at which the electro-optical material is arranged. Consequently, since the distance between the electro-optical material and the heat-dissipating layer is small and there is a difference in temperature between them, a large temperature gradient can be obtained. The quantity of heat that flows through a unit area per unit time (hereinafter, also referred to as the "heat flux density") is proportional to thermal conductivity and temperature gradient. Therefore, by increasing the temperature gradient, the heat flux density can be increased. Consequently, even if the thermal conductivity of the inorganic alignment layer is low, by producing a large temperature gradient, the heat of the electro-optical material can be efficiently dissipated.

Furthermore, when such a heat-dissipating layer is formed entirely over a pixel region or an aperture region of each pixel (i.e., a region through or from which light is transmitted or reflected), the heat-dissipating layer is preferably composed of a material having a light transmittance as high as possible.

As described above, in the electro-optical device according to the first aspect of the invention, while employing the inorganic alignment layer, the heat of the electro-optical material can be efficiently dissipated so that the properties of the electro-optical material can be prevented from being degraded.

In the electro-optical device according to the first aspect of the invention, it is preferable that a part of the heat-dissipating layer be exposed in a space between the pair of substrates.

In this case, a part of the heat-dissipating layer is exposed, for example, in the space between the pair of substrates, for example, outside a sealing region located in the periphery of the pixel region of the substrate. The term "exposed" means that a part of the heat-dissipating layer is in contact with air or a member located in the space outside the electro-optical device in a region outside the region facing the layer of the electro-optical material. Thereby, the area of the heat-dissipating layer that contributes to heat exchange between the heat-dissipating layer and air can be increased, and heat can be dissipated efficiently. Furthermore, when the heat-dissipating layer is connected, for example, to a metal case which houses the pair of substrates, the contact area can be increased, and thus the mechanical strength of the connection portion can be improved. The term "pixel region" does not mean each of the individual pixel regions, but means the entirety of the region where a plurality of pixels are two-dimensionally arrayed, and typically corresponds to an "image display region" or "display region".

In the electro-optical device according to the first aspect of the invention, it is preferable that, in plan view, the heat-dissipating layer disposed on the one of the pair of substrates protrude outside from at least a part of an edge of the other of the pair of substrates.

In this case, in plan view, the heat-dissipating layer disposed on one of the pair of substrates protrudes outside from at least a part of an edge of the other of the pair of substrates, namely, from at least a part of an edge of the substrate other than the substrate on which the heat-dissipating layer is disposed. That is, in plan view, the heat-dissipating layer disposed on one of the substrates has a portion that does not overlap the other substrate. Thereby, the area of the heat-dissipating layer that contributes to heat exchange between the heat-dissipating layer and air can be increased, and heat can be dissipated efficiently. Furthermore, when the heat-dissipating layer is connected to a metal case or the like for housing the pair of substrates, for example, an adhesive can be easily applied to the connection portion, which is practically very advantageous.

In the electro-optical device according to the first aspect of the invention, it is preferable that a product of the thickness of the heat-dissipating layer and the thermal conductivity of the heat-dissipating layer be larger than twice a product of the thickness of the inorganic alignment layer and the thermal conductivity of the inorganic alignment layer.

In this case, the temperature of the electro-optical material can be decreased by 10° C. or more as compared with a case where the heat-dissipating layer is not used. Through research, the inventor has found that the reaction rate of a photochemical reaction caused, when an electro-optical material is irradiated with light, is reduced by about half if the temperature of the electro-optical material is decreased by 10° C. Consequently, the properties of the electro-optical material can be prevented from being degraded, and the life of the electro-optical device can be prolonged, which is practically very advantageous.

In the electro-optical device according to the first aspect of the invention, it is preferable that the thermal conductivity of the heat-dissipating layer be higher than the thermal conductivity of the inorganic alignment layer.

In this case, for example, the thickness of the heat-dissipating layer which satisfies the conditions described above can be decreased (e.g., to several tens of nanometers), and the manufacturing time, cost, etc., can be reduced, which is practically very advantageous.

In the electro-optical device according to the first aspect of the invention, it is preferable that the heat-dissipating layer be disposed directly under the inorganic alignment layer.

In this case, only the inorganic alignment layer is disposed between the layer of the electro-optical material and the heat-dissipating layer, and thus a larger temperature gradient can be obtained between the electro-optical material and the heat-dissipating layer. Consequently, the heat of the electro-optical material can be dissipated more efficiently.

Furthermore, the heat-dissipating layer may be disposed under the inorganic alignment layer with another layer, such as a planarizing layer, an insulating layer, a protective layer, or a passivation layer, therebetween.

In the electro-optical device according to the first aspect of the invention, it is preferable that the electro-optical device further include a case for housing the pair of substrates, and the heat-dissipating layer be connected to the case.

In this case, the case, which is composed of a material having high thermal conductivity, such as aluminum or copper, houses the pair of substrates. The heat-dissipating layer is connected to the case. Typically, the heat-dissipating layer and the case are bonded and connected to each other with an adhesive, an adhesive tape, or the like. Thereby, the heat of the electro-optical material is transferred through the heat-dissipating layer to the case, and dissipated. Since the case has a larger area of heat exchange (i.e., heat dissipation), the heat of the electro-optical material can be dissipated more efficiently. Furthermore, the case may be provided with a heat-dissipating fin or the like.

In this case, the electro-optical device may further include a bonding portion for bonding the heat-dissipating layer and the case to each other.

In such a structure, the heat-dissipating layer and the case can be strongly mechanically connected to each other by the bonding portion, for example, composed of an adhesive. The bonding portion preferably has high thermal conductivity. For example, if metal fine particles or the like are mixed into a material constituting the bonding portion, thermal conductivity can be improved, which is practically very advantageous.

According to a second aspect of the invention, an electronic apparatus includes the electro-optical device according to the first aspect of the invention described above (including any of the preferred cases).

Since an electronic apparatus according to the second aspect of the invention includes the electro-optical device according to the first aspect of the invention, the properties of the electro-optical material can be prevented from being degraded. Therefore, it is possible to realize various electronic apparatuses, such as projection display devices, mobile phones, electronic notebooks, word processors, viewfinder type or monitor-direct-view type video tape recorders, workstations, television telephones, POS terminals, and touch panels, in which high-quality images can be displayed.

Operations and other advantages of the invention will become apparent from the following description of exemplary embodiments.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention will be described below with reference to the drawings. In the embodiments, thin film transistor (TFT) active matrix liquid crystal devices are described as examples of an electro-optical device.

First Embodiment

An electro-optical device according to a first embodiment of the invention will be described with reference to FIGS. 1 to 7. In the drawings, in order to make the individual layers and components recognizable, different scales are used for the individual layers and components.

Figure 1:
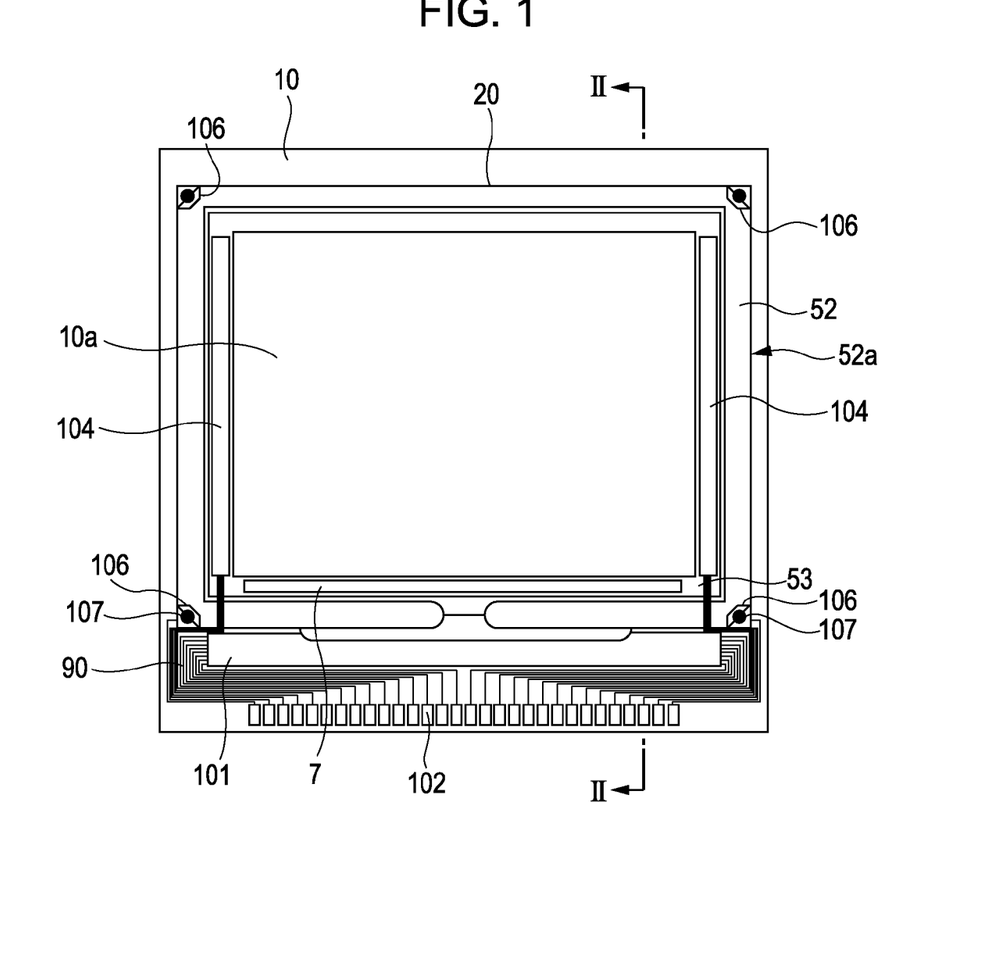
FIG. 1 is a plan view showing an overall structure of a liquid crystal device according to a first embodiment of the invention.
Figure 2:
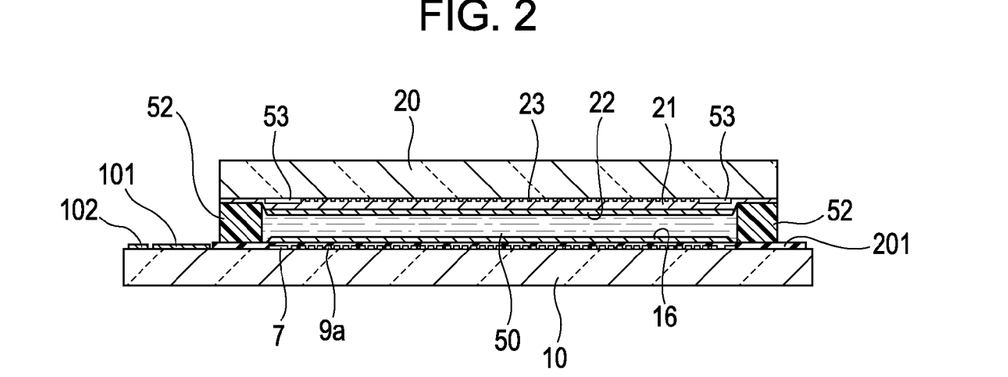
FIG. 2 is a cross-sectional view taken along the line II-II of FIG. 1.

First, an overall structure of a liquid crystal device according to this embodiment will be described with reference to FIGS. 1 and 2. FIG. 1 is a plan view showing a TFT array substrate together with the individual components disposed thereon, viewed from the counter substrate side, and FIG. 2 is a cross-sectional view taken along the line II-II of FIG. 1. To facilitate explanation, the planar positional relationship between the individual components disposed on the substrate is partially different between FIGS. 1 and 2.

Referring to FIGS. 1 and 2, in the liquid crystal device according to this embodiment, as an example of a pair of substrates, a TFT array substrate 10 and a counter substrate 20 are disposed so as to face each other. The TFT array substrate 10 is composed of a transparent substrate, such as a quartz substrate, a glass substrate, or a silicon substrate. The counter substrate 20 is composed of a transparent substrate, such as a quartz substrate or a glass substrate. A liquid crystal layer 50 containing a liquid crystal, which is an example of an electro-optical material, is sandwiched between the TFT array substrate 10 and the counter substrate 20. The liquid crystal constituting the liquid crystal layer 50 is a nematic liquid crystal having negative dielectric anisotropy, and is operated in a vertical alignment (VA) mode when the liquid crystal device is driven. The TFT substrate 10 and the counter substrate 20 are bonded to each other by a sealing material 52 provided in a sealing region 52a located in the periphery of an image display region 10a, which is an example of a pixel region.

The sealing material 52 is, for example, composed of an ultraviolet curable resin, a thermosetting resin, or a UV and thermally curable resin. In the manufacturing process, the resin is applied onto the TFT array substrate 10, and then cured by ultraviolet irradiation, heating, or the like. The sealing material 52 contains spacers, such as glass fibers or glass beads, dispersed therein so that the distance or gap between the TFT array substrate 10 and the counter substrate 20 is set to a predetermined value. Instead of or in addition to the spacers which are mixed in the sealing material 52, spacers may be arranged in the image display region 10a or in a peripheral region located in the periphery of the image display region 10a.

Referring to FIG. 1, a frame light-shielding layer 53 which defines the image display region 10a is disposed on the counter substrate 20 along the inner side of the sealing region 52a in which the sealing material 52 is arranged. However, such a frame light-shielding layer 53 may be partially or entirely provided on the TFT array substrate 10 as an embedded light-shielding layer.

In a peripheral region, a data line drive circuit 101 and external circuit connection terminals 102 are provided along one side of the TFT array substrate 10. A sampling circuit 7 is provided along this side on the internal side of the data line drive circuit 101 so as to be covered with the frame light-shielding layer 53. Scanning line drive circuits 104 are provided in frame regions along two sides adjacent to the side described above so as to be covered with the frame light-shielding layer 53.

Vertically conducting terminals 106 for connecting the two substrates with vertical conductors 107 are disposed on the TFT array substrate 10 in regions facing four corners of the counter substrate 20. Thus, the TFT array substrate 10 and the counter substrate 20 can be electrically connected to each other. Furthermore, lead wires 90 are provided for electrically connecting the external circuit connection terminals 102 to the data line drive circuit 101, the scanning line drive circuits 104, the vertically conducting terminals 106, etc.

Referring to FIG. 2, a laminate, which includes pixel-switching TFTs serving as driving elements, and lines, such as scanning lines and data lines, is disposed on the TFT array substrate 10. Although the detailed structure of the laminate is not shown in FIG. 2, pixel electrodes 9a composed of a transparent material, such as indium tin oxide (ITO), are disposed like islands in a predetermined pattern on the laminate.

A plurality of pixel electrodes 9a are disposed in the image display region 10a on the TFT array substrate 10 so as to face a counter electrode 21, which will be described below. A heat-dissipating layer 201 is disposed so as to cover the pixel electrodes 9a by depositing a transparent insulating material having relatively high thermal conductivity, such as $Al_2O_3$ or MgO, on the pixel electrodes 9a, for example, at a thickness of about 20 nm. An inorganic alignment layer 16 composed of an inorganic material, such as $SiO_2$, is disposed on the heat-dissipating layer 201.

A light-shielding layer 23 is disposed on a counter surface of the counter substrate 20 facing the TFT array substrate 10. The light-shielding layer 23 is formed like a lattice, in plan view, on the counter surface of the counter substrate 20. In the counter substrate 20, non-aperture regions are defined by the light-shielding layer 23, and regions delimited by light-shielding layer 23 correspond to aperture regions which transmit light emitted, for example, from a projector lamp or a backlight for direct viewing. Furthermore, the light-shielding layer 23 may be formed in a stripe pattern, and non-aperture regions may be defined by the light-shielding layer 23 and various components, such as data lines, provided on the TFT array substrate 10.

The counter electrode 21, which is composed of a transparent material, such as ITO, is formed in a solid pattern on the light-shielding layer 23 so as to face the plurality of pixel electrodes 9a. In order to perform color display, color filters (not shown in FIG. 2) may be disposed on the light-shielding layer 23 in a region including the aperture regions and part of the non-aperture regions in the image display region 10a. An inorganic alignment layer 22 is disposed on the counter electrode 21 on the counter surface of the counter substrate 20.

The inorganic alignment layers 16 and 22 are formed by depositing an inorganic material, for example, by oblique vapor deposition or directional sputtering, on the TFT array substrate 10 and the counter substrate 20, respectively, for example, at an angle of 40° to 60° with respect to the normal direction of the substrate, for example, at a thickness of 100 nm.

Furthermore, the TFT array substrate 10 shown in FIGS. 1 and 2 may be provided with, in addition to the data line drive circuit 101, the scanning line drive circuits 104, the sampling circuit 7, etc., a precharge circuit which supplies precharge signals with a predetermined voltage level to a plurality of data lines prior to image signals, and a testing circuit for testing the quality, defects, etc. of the liquid crystal device during manufacturing and before shipment.

Furthermore, the liquid crystal layer 50 may be composed of a liquid crystal which is operated in a twisted nematic (TN) mode, instead of the liquid crystal operated in the VA mode. That is, the liquid crystal layer 50 may be composed of a nematic crystal having positive dielectric anisotropy. In such a case, the inorganic alignment layers 16 and 22 are formed by depositing an inorganic material, for example, by oblique vapor deposition or directional sputtering, on the TFT array substrate 10 and the counter substrate 20, respectively, for example, at an angle of 80° to 85° with respect to the normal direction of the substrate.

Figure 3:
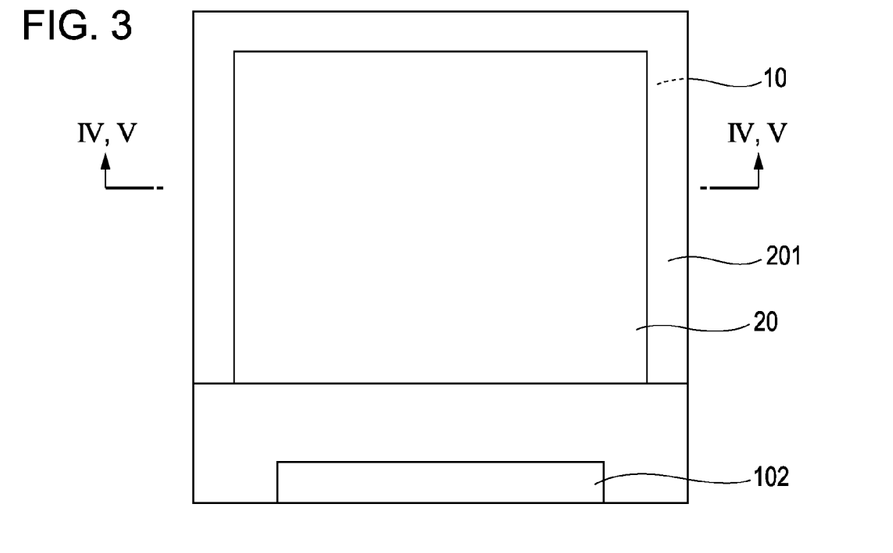
FIG. 3 is a plan view showing the liquid crystal device according to the first embodiment.
Figure 4:
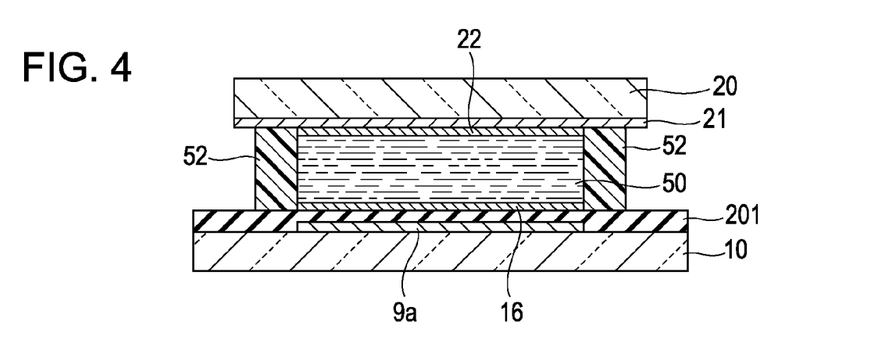
FIG. 4 is a cross-sectional view taken along the line IV-IV of FIG. 3.
Figure 5:
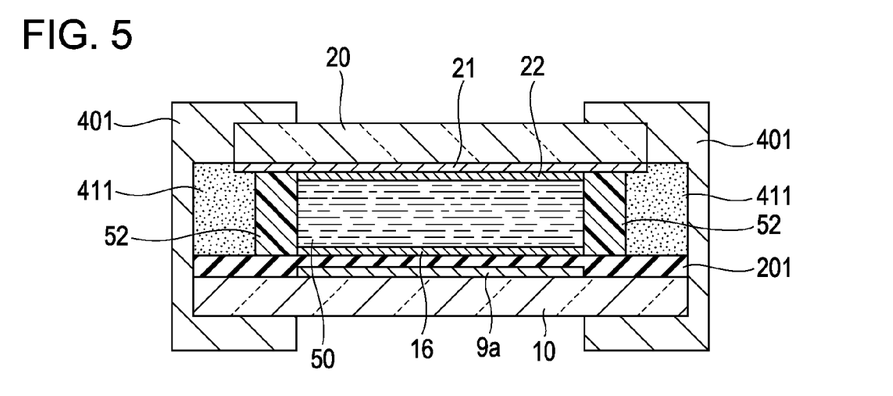
FIG. 5 is a cross-sectional view showing the liquid crystal device according to the first embodiment, taken along the line V-V of FIG. 3, the liquid crystal device being housed in a case.

The heat-dissipating layer 201 will be further described with reference to FIGS. 3 to 5. FIG. 3 is a plan view showing the liquid crystal device according to this embodiment, viewed from the counter substrate side, and FIG. 4 is a cross-sectional view taken along the line IV-IV of FIG. 3. FIG. 5 is a cross-sectional view showing a state in which the liquid crystal device according to this embodiment is housed in a case, taken along the line V-V of FIG. 3. In FIGS. 3 to 5, the individual components shown in FIGS. 1 and 2 are omitted appropriately.

As shown FIG. 3, the heat-dissipating layer 201 disposed on the TFT array substrate 10 protrudes outside from some parts of the edges of the counter substrate 20. Furthermore, as shown in FIG. 4, the heat-dissipating layer 201 is exposed at portions disposed outside the sealing region 52a in which the sealing material 52 is disposed. That is, some parts of the heat-dissipating layer 201 are exposed in a space between the TFT array substrate 10 and the counter substrate 20. Since some parts of the heat-dissipating layer 201 are exposed, the heat of the heat-dissipating layer 201 can be dissipated. In this embodiment, in particular, the heat-dissipating layer 201 protrudes outside from some parts of the edges of the counter substrate 20. Consequently, the area of the exposed portion can be increased, and heat can be dissipated efficiently.

As shown in FIG. 5, when the liquid crystal device is housed in a case 401 composed of a metal having high thermal conductivity, such as aluminum, the heat-dissipating layer 201 and the case 401 are bonded to each other by a bonding portion 411, for example, composed of a silicon-based molding material. In such a manner, the exposed portion of the heat-dissipating layer 201 also serves as a connection portion. Since the exposed portion of the heat-dissipating layer 201 is large, heat can be transferred efficiently to the case 401 having higher heat dissipation efficiency.

Since such a heat-dissipating layer 201 is disposed in the vicinity of the liquid crystal layer 50, a relatively large temperature gradient can be obtained between the liquid crystal layer 50 and the heat-dissipating layer 201. Consequently, the heat of the liquid crystal layer 50 is easily transferred to the heat-dissipating layer 201, and the heat of the liquid crystal layer 50 can be dissipated efficiently. Therefore, it is possible to prevent the degradation of the properties of the liquid crystal constituting the liquid crystal layer 50 due to heat.

Figure 6:
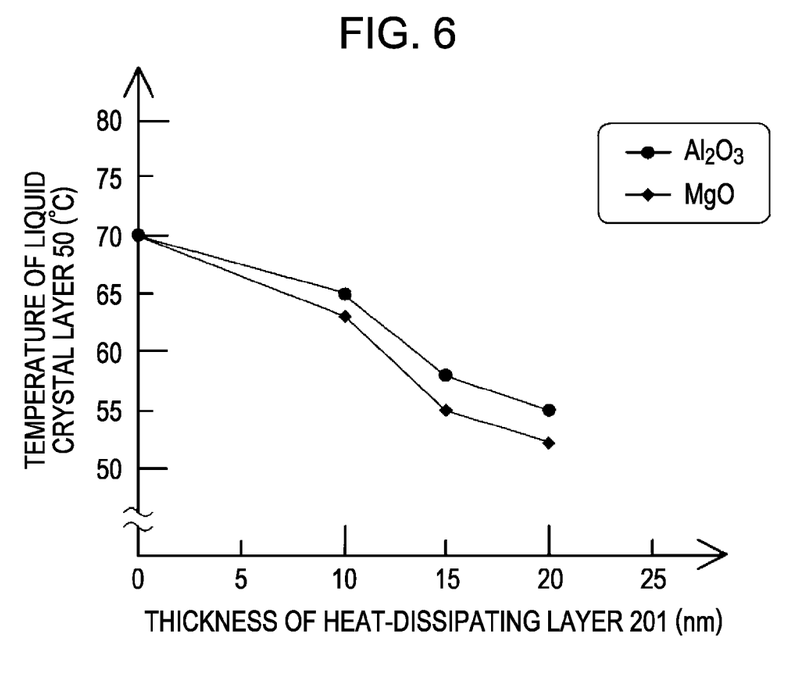
FIG. 6 is a graph showing an example of the relationship between the thickness of the heat-dissipating layer and the temperature of the liquid crystal layer.
Figure 7:
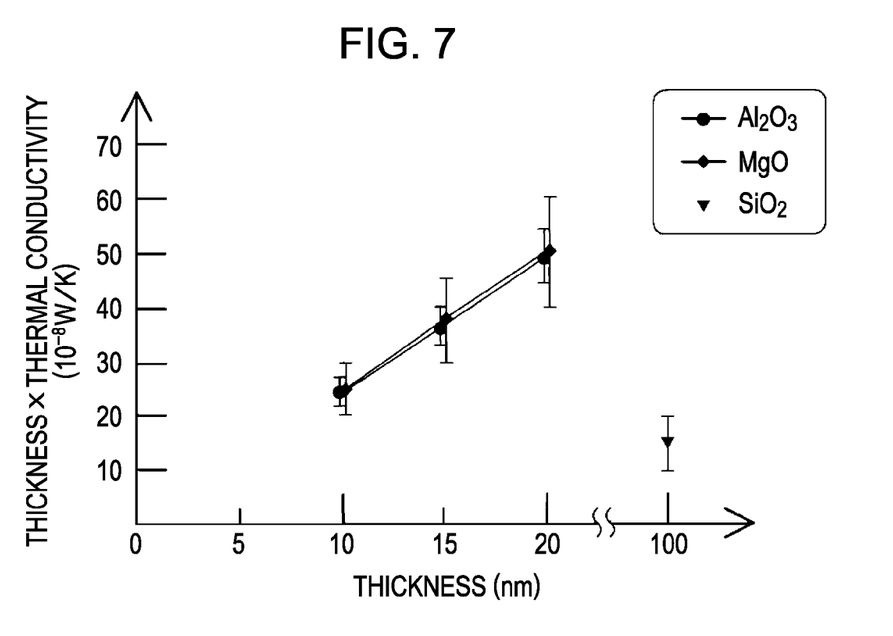
FIG. 7 is a graph showing an example of the relationship between the thickness of each of the heat-dissipating layer and the inorganic alignment layer and the product of the thickness of each layer and the thermal conductivity of the material constituting each layer.

The thickness of the heat-dissipating layer 201 will now be described with reference to FIGS. 6 and 7. FIG. 6 is a graph showing an example of the relationship between the thickness of the heat-dissipating layer and the temperature of the liquid crystal layer, and FIG. 7 is a graph showing an example of the relationship between the thickness of each of the heat-dissipating layer and the inorganic alignment layer and the product of the thickness of each layer and the thermal conductivity of the material constituting each layer. FIGS. 6 and 7 show measured values when light of 3 W/cm$^2$ was applied to liquid crystal devices having an inorganic alignment layer with a thickness of 100 nm and a heat dissipating layer with a thickness of 0, 10, 15, or 20 nm. In the graphs, the circle represents a case where a heat-dissipating layer 201 is composed of $Al_2O_3$, and the diamond represents a case where the heat-dissipating layer 201 is composed of MgO. The triangle represents an inorganic alignment layer 16 composed of $SiO_2$. In each graph, the measurement points are interpolated with straight lines.

As shown in FIG. 6, when the thickness of the heat-dissipating layer 201 is 15 nm or more, the temperature of the liquid crystal layer 50 can be decreased by 10° C. or more as compared with a case where the heat-dissipating layer 201 is not used. Through research, the inventor has found that, if the temperature of the liquid crystal layer 50 is decreased by 10° C., the reaction rate of a photochemical reaction of liquid crystal is reduced by about half, that is, the life of the liquid crystal device can be almost doubled. Consequently, if the conditions under which the temperature of the liquid crystal layer 50 is decreased by 10° C. or more can be quantitatively determined, liquid crystal devices can be designed appropriately by selecting the material and the thickness so as to satisfy the conditions required.

The inventor has paid attention to a parameter of the product of thermal conductivity and thickness, which shows heat transfer characteristics of a material. As shown in FIG. 7, with respect to the inorganic alignment layer 16, the parameter value is 15, and with respect to the heat-dissipating layer 201 with a thickness of 15 nm, the parameter value is about 37 for each of $Al_2O_3$ and MgO. On the basis of these results, the inventor has concluded that if the product of the thickness of the heat-dissipating layer and the thermal conductivity of the heat-dissipating layer is larger than twice the product of the thickness of the inorganic alignment layer and the thermal conductivity of the inorganic alignment layer, the temperature of the liquid crystal layer 50 can be decreased by 10° C.

or more even if the value changes within the margin of error. Note that the errors shown in FIG. 7 are caused by changes in thermal conductivity due to film deposition conditions, etc.

Second Embodiment

Figure 8:
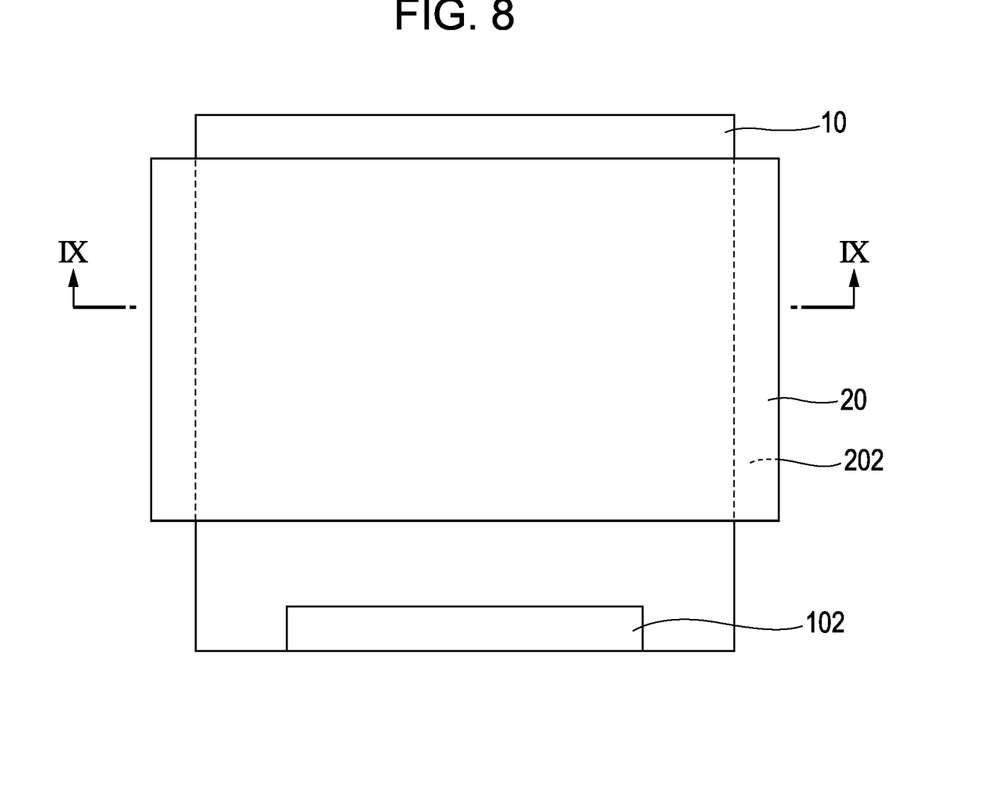
FIG. 8 is a plan view showing a liquid crystal device according a second embodiment of the invention.
Figure 9:
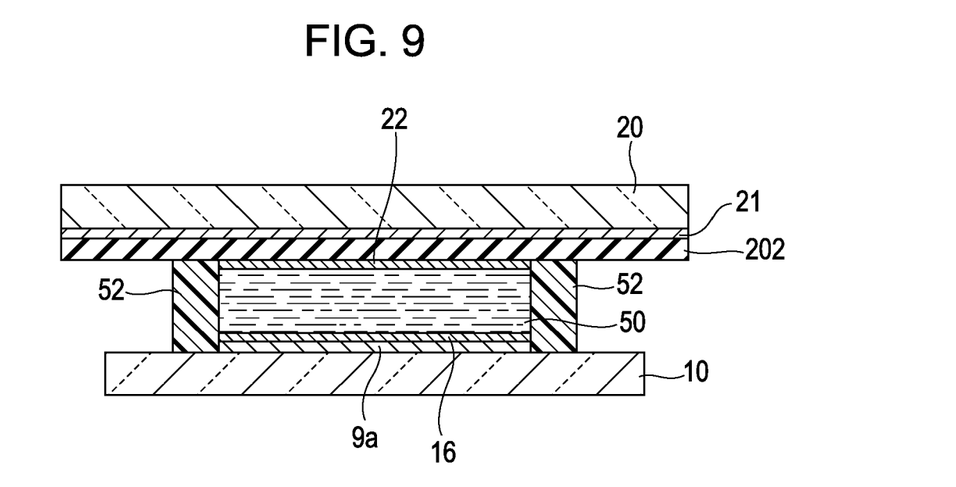
FIG. 9 is a cross-sectional view taken along the line IX-IX of FIG. 8.

An electro-optical device according to a second embodiment of the invention will be described with reference to FIGS. 8 and 9. FIG. 8, which corresponds to FIG. 3, is a plan view showing a liquid crystal device according to this embodiment, viewed from the counter substrate side, and FIG. 9 is a cross-sectional view taken along the line IX-IX of FIG. 8. The second embodiment has the same structure as the first embodiment except that a heat-dissipating layer is disposed on a counter substrate. Consequently, in the second embodiment, duplicate descriptions will be omitted, and the same components or parts as those of the first embodiment are designated by the same reference numerals. Basically, only differences will be described with reference to FIGS. 8 and 9.

As shown in FIG. 9, a heat-dissipating layer 202 is disposed on a counter electrode 21 disposed on a counter substrate 20. An inorganic alignment layer 22 is disposed on the heat-dissipating layer 202. Some parts of the heat-dissipating layer 202 are exposed in a space between a TFT array substrate 10 and the counter substrate 20. Furthermore, as shown in FIG. 8, in plan view, the heat-dissipating layer 202 protrudes outside from some parts of the edges of the TFT array substrate 10. An inorganic alignment layer 16 is disposed so as to cover pixel electrodes 9a disposed on the TFT array substrate 10.

Third Embodiment

Figure 10:
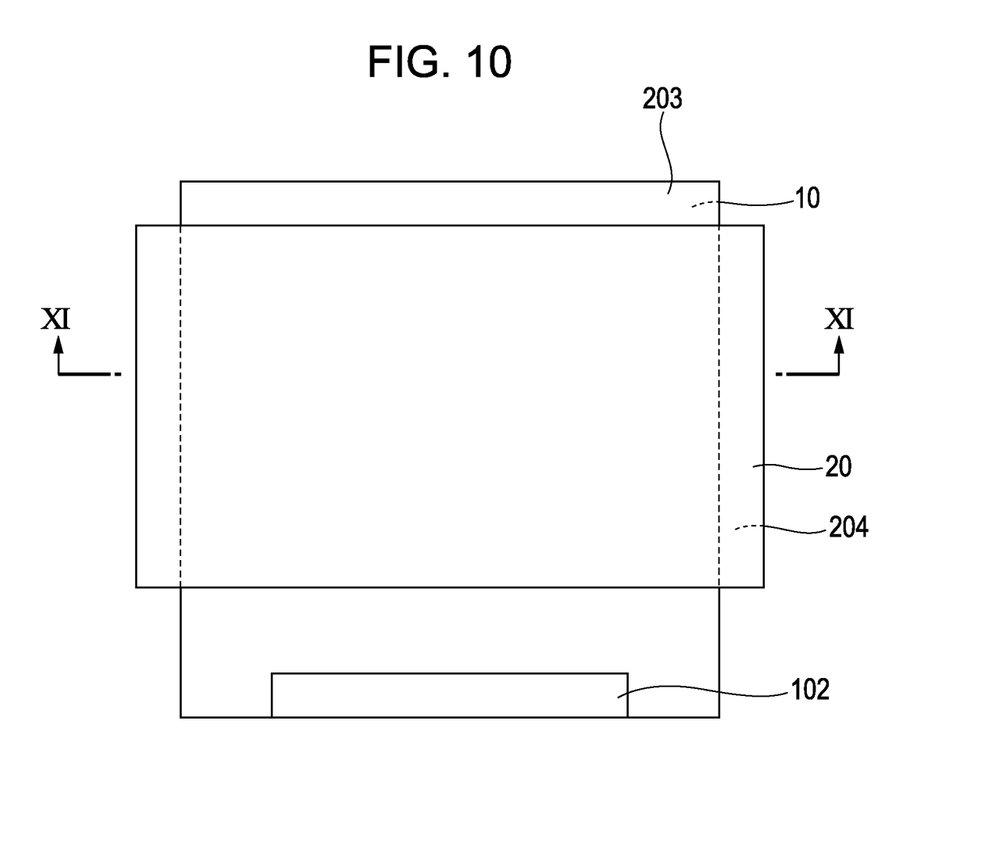
FIG. 10 is a plan view showing a liquid crystal device according a third embodiment of the invention.
Figure 11:
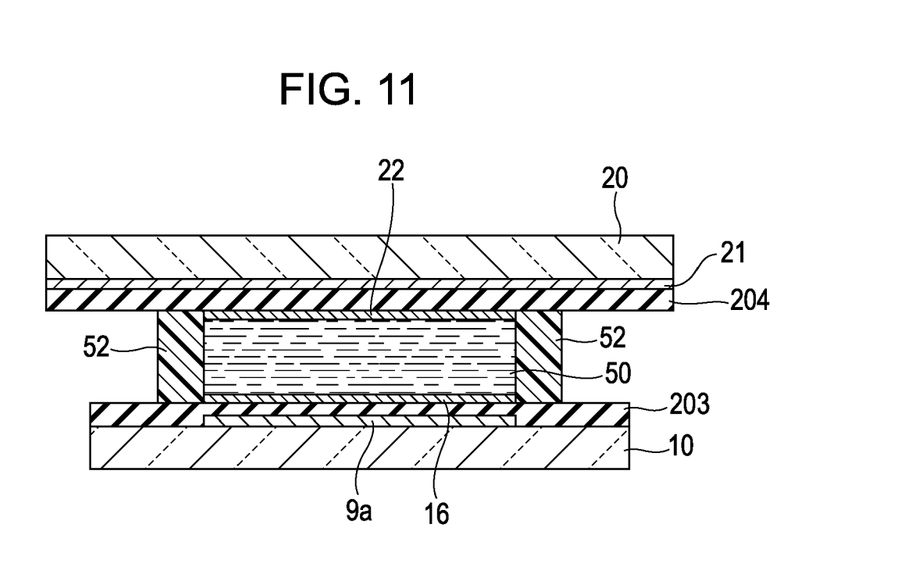
FIG. 11 is a cross-sectional view taken along the line XI-XI of FIG. 10.

An electro-optical device according to a third embodiment of the invention will be described with reference to FIGS. 10 and 11. FIG. 10, which corresponds to FIG. 3, is a plan view showing a liquid crystal device according to this embodiment, viewed from the counter substrate side, and FIG. 11 is a cross-sectional view taken along the line XI-XI of FIG. 10. The third embodiment has the same structure as the first embodiment except that heat-dissipating layers are disposed on a TFT array substrate and a counter substrate. Consequently, in the third embodiment, duplicate descriptions will be omitted, and the same components or parts are designated by the same reference numerals. Basically, only differences will be described with reference to FIGS. 10 and 11.

As shown in FIG. 11, a heat-dissipating layer 203 is disposed on a TFT array substrate 10 so as to cover pixel electrodes 9a. An inorganic alignment layer 16 is disposed on the heat-dissipating layer 203. On the other hand, a heat-dissipating layer 204 is disposed on a counter electrode 21 disposed on a counter substrate 20. An inorganic alignment layer 22 is disposed on the heat-dissipating layer 204.

As shown in FIG. 10, in plan view, the heat-dissipating layer 203 protrudes outside (upward in FIG. 10) from an edge of the counter substrate 20, and the heat-dissipating layer 204 protrude outside (leftward and rightward in FIG. 10) from some parts of the edges of the TFT array substrate 10.

In such a structure, since the heat-dissipating layers 203 and 204 are disposed on both sides, in the deposition direction, of the liquid crystal layer 50, the heat of the liquid crystal layer 50 can be dissipated more efficiently.

Electronic Apparatus

Figure 12:
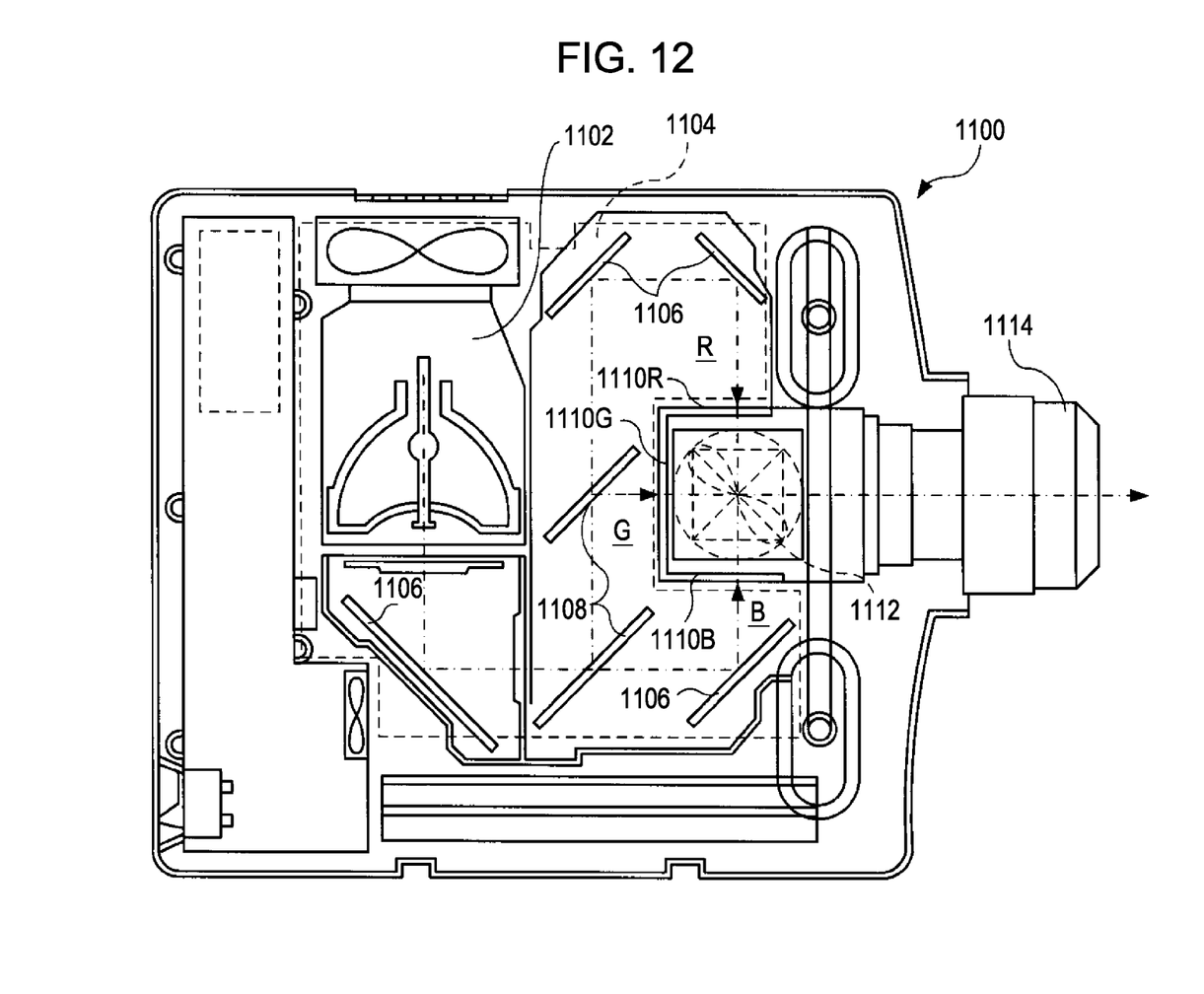
FIG. 12 is a plan view showing a structure of a projector which is an example of an electronic apparatus to which an electro-optical device is applied.

A case where the liquid crystal device described above is applied to a projector, which is an example of an electronic apparatus, will be described below with reference to FIG. 12. A liquid crystal panel in the liquid crystal device described above is used as a light valve of the projector. FIG. 12 is a plan view which shows an example of a structure of the projector.

As shown in FIG. 12, a projector 1100 includes a lamp unit 1102 composed of a white light source, such as a halogen lamp. Projection light, which is emitted from the lamp unit 1102, is separated by four mirrors 1106 and two dichroic mirrors 1108 into light components corresponding to three primary colors R, G, and B. The three light components are made incident on liquid crystal panels 1110R, 1110G, and 1110B, which are light valves corresponding to the individual primary colors.

The liquid crystal panels 1110R, 1110G, and 1110B have the same structure as the liquid crystal device described above and are driven by the primary color signals R, G, and B supplied from an image signal processing circuit. The light components modulated by the liquid crystal panels are made incident on a dichroic prism 1112 from three directions. In the dichroic prism 1112, the light components R and B are refracted by 90° while the light component G goes straight. Thus, the images of the individual colors are combined, and consequently, a color image is projected onto a screen or the like through a projection lens 1114.

With respect to the images displayed by the liquid crystal panels 1110R, 1110B, and 1110G, it is required that the images displayed by the liquid crystal panels 1110R and 1110B be mirror-reversed with respect to the image displayed by the liquid crystal panel 1110G.

Furthermore, since the light components corresponding to three primary colors R, G, and B are made incident on the liquid crystal panels 1110R, 1110G, and 1110B by the dichroic mirror 1108, it is not necessary to use color filters.

Besides the electronic apparatus described with reference to FIG. 12, examples of an electronic apparatus to which the liquid crystal device is applicable include mobile personal computers, mobile phones, liquid crystal televisions, viewfinder type or monitor-direct-view type video tape recorders, car navigation systems, pagers, electronic notebooks, electronic calculators, word processors, workstations, television telephones, POS terminals, and apparatus provided with touch panels.

Furthermore, besides the liquid crystal devices described in the above embodiments, the invention is also applicable to reflective liquid-crystal-on-silicon (LCOS) displays in which elements are disposed on a silicon substrate, plasma display panels (PDPs), field emission displays (FEDs), surface-conduction electron-emitter displays (SEDs), organic EL displays, digital micro-mirror devices (DMDs), electrophoresis devices, etc.

The invention is not limited to the embodiments described above, and appropriate modifications can be made within the scope and spirit of the invention, which can be understood from the claims and the entire specification. Electro-optical devices and electronic apparatuses including the electro-optical devices in which such modifications are made are also included within the technical range of the invention.

What is claimed is:
1. An electro-optical device comprising:
a pair of substrates;
a sealing material in the form of a frame provided between the pair of substrates;
an electro-optical material sandwiched between the pair of substrates and formed within the frame provided between the pair of substrates;
an electrode disposed on one of the pair of substrates;
an inorganic alignment layer disposed on the one of the pair of substrates and formed between the electrode and the electro-optical material so as to be enclosed within the frame provided between the pair of substrates; and a heat-dissipating layer disposed between the electrode and the inorganic alignment layer disposed on the one of the pair of substrates, the heat-dissipating layer completely enclosing the electrode, and wherein the heat-dissipating layer has a thickness of less than 20 nanometers, and wherein a product of a thickness of the heat-dissipating layer and a thermal conductivity of the heat-dissipating layer is larger than twice a product of a thickness of the inorganic alignment layer and a thermal conductivity of the inorganic alignment layer, wherein the sealing material is formed on an upper surface of the heat-disspating layer such that the electrode is not enclosed in the frame of the sealing material, the electrode having an island shape and being disposed completely within the frame in plan view, while the heat-dissipating layer extends beyond each side of the frame of the sealing material.

2. The electro-optical device according to claim 1, wherein a part of the heat-dissipating layer is exposed in a space between the pair of substrates.

3. The electro-optical device according to claim 1, wherein a thermal conductivity of the heat-dissipating layer is higher than a thermal conductivity of the inorganic alignment layer.

4. The electro-optical device according to claim 1, wherein the heat-dissipating layer is disposed directly under the inorganic alignment layer.

5. The electro-optical device according to claim 1, further comprising a case for housing the pair of substrates, wherein the heat-dissipating layer is connected to the case.

6. The electro-optical device according to claim 5, further comprising a bonding portion for bonding the heat-dissipating layer and the case to each other.

7. An electronic apparatus comprising:
the electro-optical device according to claim 1.

8. An electro-optical device comprising:
a pair of substrates;
a sealing material in the form of a frame provided between the pair of substrates;
an electro-optical material sandwiched between the pair of substrates;
an electrode provided on one of the pair of substrates;
an inorganic alignment layer covering the electrode; and
a heat-dissipating layer disposed between the electrode and the inorganic alignment layer inside the sealing material, the heat-dissipating layer completely enclosing the electrode, and the heat-dissipating layer being exposed from the inorganic alignment layer outside the sealing material,
wherein the sealing material is formed on an upper surface of the heat-disspating layer such that the electrode is not enclosed in the frame of the sealing material, the electrode having an island shape and being disposed completely within the frame in plan view, while the heat-dissipating layer extends beyond each side of the frame of the sealing material.

9. The electro-optical device according to claim 1, wherein the heat-dissipating layer includes $Al_2O_3$ or Mg.

* * * * *